Patented Sept. 16, 1952

2,610,954

UNITED STATES PATENT OFFICE 2,610,954

OXIDIZED ALKALI LIGNIN AS A RUBBER REINFORCING AGENT

Rudolf A. V. Raff and George H. Tomlinson, Jr., Cornwall, Ontario, Canada, assignors to Howard Smith Paper Mills Limited, Montreal, Quebec, Canada No Drawing. Application February 27, 1948, Serial No. 11,853

4 Claims. (Cl. 260—17.5)

This invention relates to improvements in the production of reinforced rubbers.

More particularly, the invention consists in the production of reinforced natural and/or synthetic rubbers in which the reinforcing agent consists of oxidized alkali lignin.

In the present instance the invention will be described as applied to the incorporation of oxidized alkali lignin as a reinforcing agent in in a rubber master batch of the GR–S rubber latex type but this is merely illustrative since the invention is intended for application to the production of all types of natural and/or synthetic rubbers which can be advantageously reinforced by the incorporation therein of oxidized alkali lignin.

It may be noted here that the above-mentioned term "GR–S" is an abbreviation for "Government Rubber—Type S" and that this type of rubber is an elastomer formed as a latex by co-polymerization of an aqueous emulsion of styrene with butadiene under the influence of a catalyst.

In the alkali pulping processes, wood or other vegetable matter is digested with an aqueous alkali, the lignin and other non-cellulose organic matter thus passing into solution. The lignin may be isolated by precipitation from spent digestion liquor, commonly known as black liquor, with acid. If a relatively weak acid such as carbonic acid is used a product precipitates which has been termed the "lignin acid salt." This product, although insoluble in the presence of the inorganic salts of the carbonated black liquor, can be redissolved in hot water. The lignin acid salt either as such, or in aqueous solution, can be freed of its sodium content by treatment with a strong acid such as sulfuric acid which renders it insoluble in water. Such a product is referred to as "alkali lignin." Alternatively, the alkali lignin may be obtained directly from the spent digestion liquor by the use of a strong acid such as sulfuric acid.

We have found that the melting point of alkali lignins as produced from fresh black liquor by the methods described will vary somewhat depending on the species of the wood from which the lignin originated. The melting point will be in the range of 155° C. to 220° C. with the deciduous wood lignins being in the lower range and coniferous wood lignins being in the upper range. When a solution of the sodium salt or the sodium acid salt of the alkali lignin is treated with air, the oxygen in the air reacts with the lignin and we have found that when the lignin is precipitated with strong acid after such a treatment it exhibits a higher melting point than is obtained in the absence of such an oxidation treatment. For example we have found that starting with a lignin having a melting point of 160° C. it is possible by regulating the amount of oxidation to produce lignins which remain infusible at any desired temperature in excess of 160° C. including lignins that the infusible at 360° C.

Whereas unoxidized or only slightly oxidized lignins of a melting range between 155 and 220° C. give insufficient reinforcement of rubbers, we have found that it is possible to consistently prepare reinforced rubbers comparable in strength and resistance to rubbers reinforced with the best grades of channel black by first subjecting the lignins to be incorporated in the rubber latex to an oxidation treatment sufficient to raise the melting point above 240° C.

This oxidation may be carried out by bubbling air or oxygen through an aqueous solution of lignin acid salt or lignin salt, or in other ways, such as by purposely oxidizing the black liquor prior to, or during its precipitation treatment or by oxidizing the lignin acid salt in dry powdered form in a current of hot air or oxygen. Such oxidations may be carried out in the presence or absence of catalysts such as the oxides of cobalt, vanadium, molybdenum, manganese, etc., or through the use of specific oxidizing agents such as sodium peroxide. The oxidation should be continued until the melting point of the modified lignin, after acid precipitation and drying, is at least 240° C. and preferably of the order of 300° C. or even higher. Concomitant with oxidation is an increase in the viscosity of non-aqueous solutions, and for any given initial lignin, this property may also be used as an index for adequate oxidation. A solution of the oxidized lignin acid salt or lignin salt may then be mixed with the rubber latex and the lignin and rubber co-precipitated by acidification with a strong acid such as sulfuric or hydrochloric acid to which a salt such as sodium chloride or alum can be added to promote coagulation.

Example I (1) 167 lbs. of "alkali lignin" from aspen wood were dissolved in 900 lbs. of a solution containing 18 lbs. sodium peroxide. The oxidation of this solution was carried out with air in a "Rotoclone" at 60–70° C. for 5 hours. An amount of this solution containing 108 lbs. of the oxidized lignin was mixed with 768 lbs. of GR–S rubber latex, containing 216 lbs. of GR–S solids. The mixture was heated to 95° C. and slowly precipitated under continuous stirring with a solution of 40 lbs. of concentrated sulfuric acid and 40 lbs. sodium chloride in water, yielding a final pH of 2.5. The slurry showed a high filtering speed and could be washed very easily. The crumb was dried, compounded and cured. The described oxidation treatment had increased the melting point of the lignin from 167° C. to over 250° C., and the viscosity of a 10% solution in "Cellosolve" from 4.24 to 4.55 cp. For purposes of comparison, master batches were also prepared from the original unoxidized lignin and from the best grade of channel black, the former being co-precipitated as above and the latter being milled in. The three master batches were made up and compounded in the following proportions:

|  | A | B | C |
|---|---|---|---|
| GR–S | 100 | 100 | 100 |
| Original alkali lignin from aspen wood | 50 |  |  |
| Oxidized alkali lignin from aspen wood |  | 50 |  |
| E. P. Channel Black |  |  | 50 |
| Softener | 5 | 5 | 5 |
| Zinc Oxide | 5 | 5 | 5 |
| Vulcanization Accelerator | 1.5 | 1.5 | 1.5 |
| Cumate | 0.3 | 0.3 | 0.3 |
| Sulfur | 2.0 | 2.0 | 2.0 |

These samples were vulcanized at a temperature of 145° C. and then tested, giving the following results:

|  | Reinforcing Agent used | Tensile at Break, p. s. i. | Elongation, percent | Modulus (300% p. s. i.) |
|---|---|---|---|---|
| A | Original alkali lignin from aspen wood | 2,230 | 730 | 500 |
| B | Oxidized alkali lignin from aspen wood | 3,048 | 630 | 900 |
| C | Best grade of Channel Black | 3,300 | 675 | 1,085 |

When the sulfur in Formula B was increased to 4.0% and the "Cumate" reduced to 0.1%, the following values were obtained:

Tensile, p. s. i. _____ 3375
Elongation, per cent _____ 700
Modulus at 300%, p. s. i. _____ 834

The above described method of co-precipitation can be modified by using different coagulants, as well as by changing the order in which the reactants are added. The particle size of the crumb can be controlled by varying the speed of stirring and the temperature.

Example II (2) A sulfate liquor from coniferous wood was treated with flue gas and heated. The separated lignin acid salt was dissolved in hot water and the resultant solution of the sodium lignin salt treated for four hours at 90° C. with hot air, in the presence of 0.2% of a cobalt-containing catalyst, as calculated on the amount of lignin. The catalyst was prepared by adding sodium hydroxide to a solution of cobalt sulfate and oxidizing with hydrogen peroxide till color change. The lignin, which prior to oxidation, melted at 208° C. did not melt when heated up to 360° C. and the viscosity of a 10% solution in Cellosolve had increased from 4.92 to 6.52. Co-precipitation of both the unoxidized and oxidized lignin with GR–S latex in the same ratio as in Example I was carried out and the resultant master batches were compounded, vulcanized and tested as before. The results obtained were as follows:

| Reinforcing agent used | Tensile at Break, p. s. i. | Elongation, percent | Modulus (300 p. s. i.) |
|---|---|---|---|
| Original lignin from coniferous wood | 2,185 | 631 | 889 |
| Oxidized lignin from coniferous wood | 3,099 | 682 | 884 |

Having thus described the nature of the invention with the aid of several examples, it will be understood that various modifications may be resorted to within the scope and spirit of the invention as defined by the appended claims. It will also be understood that the term "rubber" as used in the appended claims is to be construed as covering both natural and synthetic rubbers to which the invention is applicable.

We claim:

1. As a new article of manufacture, a reinforced rubber product consisting of butadiene-styrene-copolymer latex having incorporated therein a reinforcing agent consisting of oxidized alkali lignin having a melting point above 240° C. and derived from plant material selected from the group consisting of aspen and coniferous plants.

2. As a new article of manufacture, a reinforced rubber product consisting of butadiene-styrene-copolymer latex having incorporated therein a reinforcing agent consisting of acid-precipitated, oxidized alkali lignin having a melting point above 240° C. and derived from plant material selected from the group consisting of aspen and coniferous plants.

3. As a new article of manufacture, a reinforced rubber product consisting of butadiene-styrene-copolymer latex having incorporated therein a reinforcing agent consisting of oxidized alkali lignin having a melting point ranging from above 240° C. to 360° C. and derived from plant material selected from the group consisting of aspen and coniferous plants.

4. The method of producing a lignin-reinforced butadiene-styrene-copolymer latex which comprises subjecting a solution of alkali lignin derived from plant material selected from the group consisting of aspen and coniferous plants to a controlled oxidizing treatment with air to thereby raise the melting point of the lignin above 240° C., adding the solution of oxidized lignin to a butadiene-styrene-copolymer latex and subjecting the resulting mixture of latex and lignin to the precipitating action of an acid.

RUDOLF A. V. RAFF.
GEORGE H. TOMLINSON, Jr.

(References on following page)

REFERENCES CITED

The following references are of record in the file of this patent:

UNITED STATES PATENTS

| Number | Name | Date |
| --- | --- | --- |
| 2,140,863 | Sunesson | Dec. 20, 1938 |
| 2,343,368 | Daly | Mar. 7, 1944 |
| 2,355,180 | Remy | Aug. 8, 1944 |

FOREIGN PATENTS

| Number | Country | Date |
| --- | --- | --- |
| 336,984 | Great Britain | Oct. 20, 1930 |

OTHER REFERENCES

Indulin, West Virginia Pulp and Paper Co. (1946), pages 7-30.

"Rubber Age" (N. Y.) of November, 1948, pp. 197-200.

"J. Rubber Research," vol. 18 of Jan. 1949, pp. 1-11.